Jan. 29, 1957 G. W. LAUGHTON 2,779,363
BARK-PEELING DEVICE HAVING REVOLVING ENDLESS-CARRIER-MOUNTED
CUTTERS DRIVEN BY PLANETARY GEARS
Filed Nov. 9, 1954 4 Sheets-Sheet 1

INVENTOR.
George W. Laughton
BY
Richard P. Cardew
AGENT

INVENTOR.
George W. Laughton
BY
Richard P. Cardew
AGENT

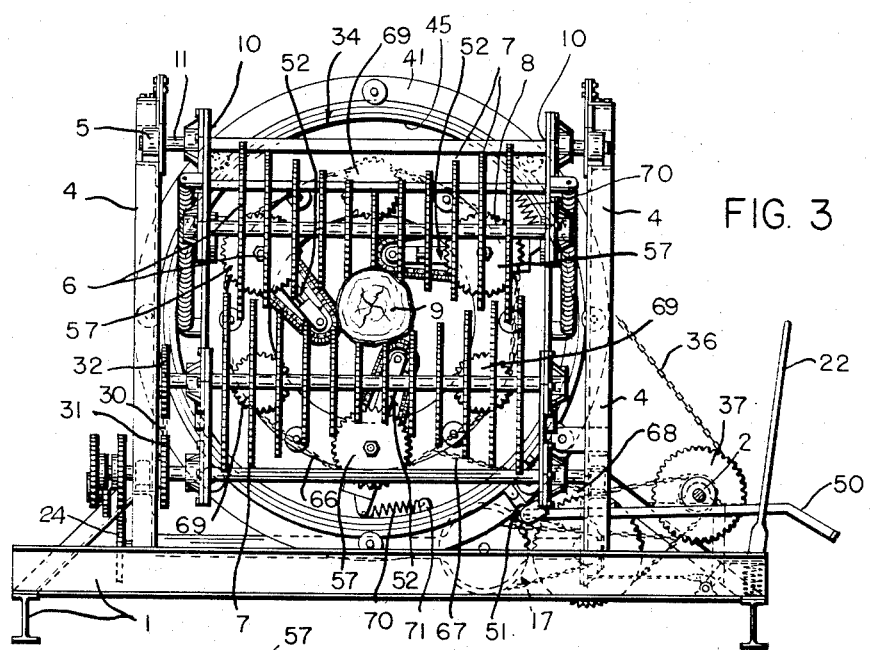
FIG. 3
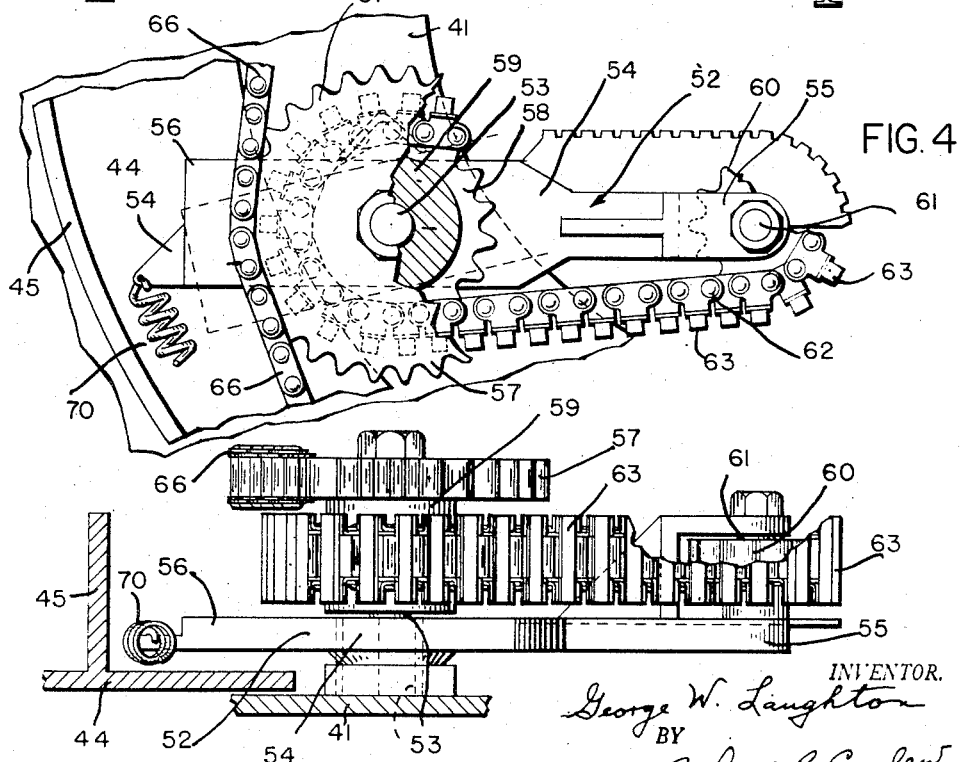
FIG. 4
FIG. 5
INVENTOR.
George W. Laughton
BY
Richard P. Carden
AGENT Jan. 29, 1957  G. W. LAUGHTON  2,779,363
BARK-PEELING DEVICE HAVING REVOLVING ENDLESS-CARRIER-MOUNTED
CUTTERS DRIVEN BY PLANETARY GEARS
Filed Nov. 9, 1954  4 Sheets-Sheet 4
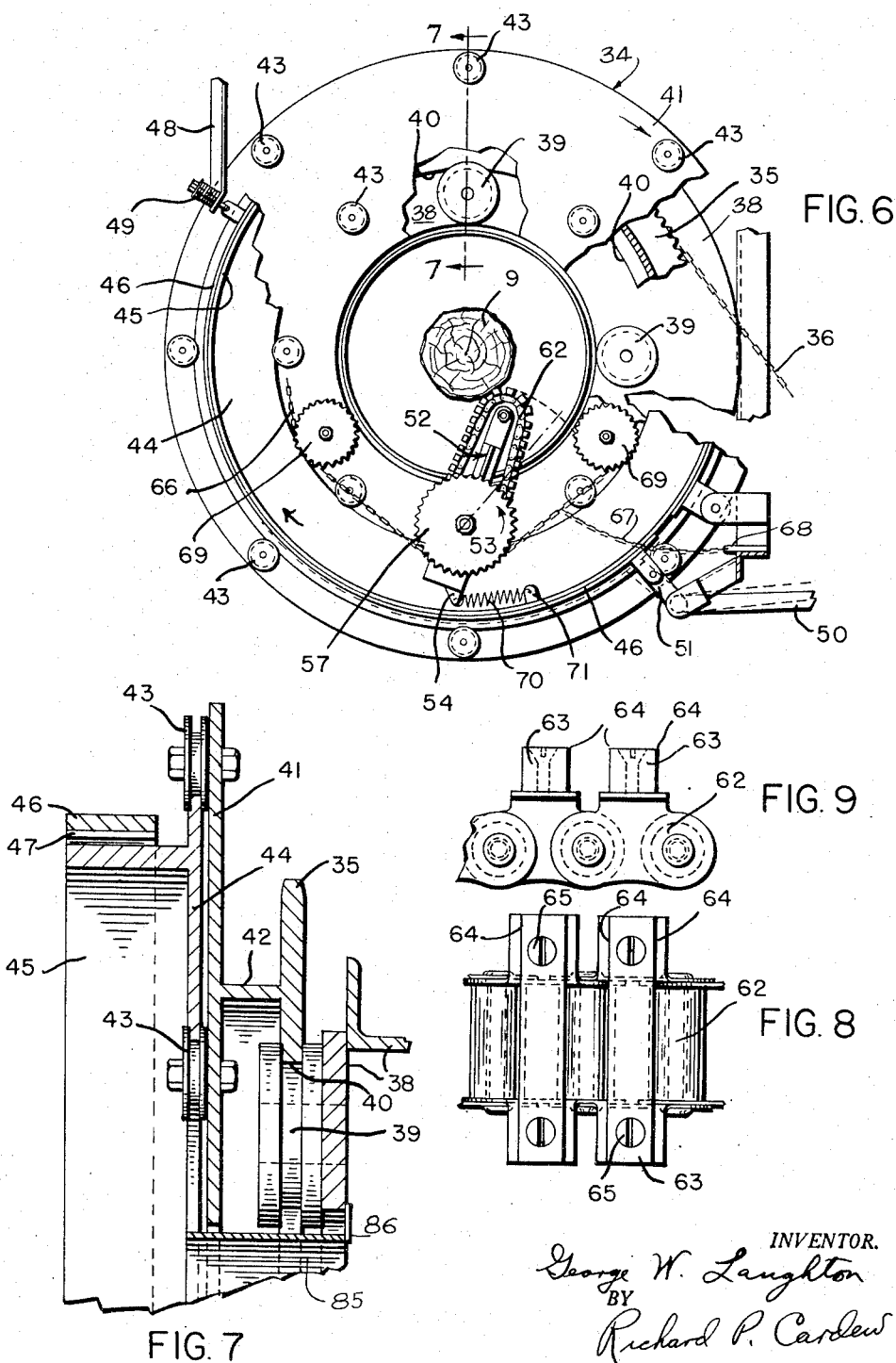
INVENTOR.
George W. Laughton
BY
Richard P. Cardew
AGENT United States Patent Office 2,779,363
Patented Jan. 29, 1957

2,779,363

BARK-PEELING DEVICE HAVING REVOLVING ENDLESS-CARRIER-MOUNTED CUTTERS DRIVEN BY PLANETARY GEARS

George William Laughton, Duluth, Minn.

Application November 9, 1954, Serial No. 467,720

4 Claims. (Cl. 144—208)

This invention relates to a machine for removing bark from pulpwood, logs and the like.

There has long been a search for an efficient machine which will remove bark from pulpwood, logs and the like.

Some of the difficulties that are encountered in the making of such a machine are that logs and pulpwood are not necessarily straight, nor are they necessarily free of knots. Also the logs do not taper uniformly from one end to the other, and bark varies in thickness with different types of wood. A bark removing machine must be capable of handling crooked and knotty logs as well as various thicknesses of bark. The machine must also be capable of removing the bark with the least possible damage to the wood.

A barking machine must also be capable of handling wood at a relatively fast rate so that the bark may be removed from a large number of logs in a day so that the process will be economical.

It is, therefore, one of my principal objects to provide a machine for removing bark from logs and the like in a most efficient manner.

Another object is to provide such a machine which will be economical to operate and which will not damage the logs so as to spoil them for their intended use.

Another object is to provide a cutter to insure the efficient removing of the bark.

Another object is to provide a novel means for driving the cutters for efficient operation.

These and other objects and advantages of this invention will become more apparent as the description proceeds.

In the accompanying drawing forming a part of this application:

Fig. 3 is a right end view of Fig. 1.

Fig. 4 is a fragmental right end elevation showing the drive and other structural parts of one of the cutters.

Fig. 5 is a bottom view of Fig. 4 with parts broken away.

Fig. 6 is a right end elevation of the peeling head with parts broken away to disclose the construction thereof.

Fig. 7 is a radial sectional view through the outer edge of the peeling head, as indicated by the section line 7—7 of Fig. 6, but including a brake band and drum which has been broken away in the corresponding portion of Fig. 6.

Fig. 8 is a top plan view of some of the cutter teeth of the cutter blades illustrating their mounting on their carrier chain.

Fig. 9 is a front elevation of Fig. 8.

Figure 1:
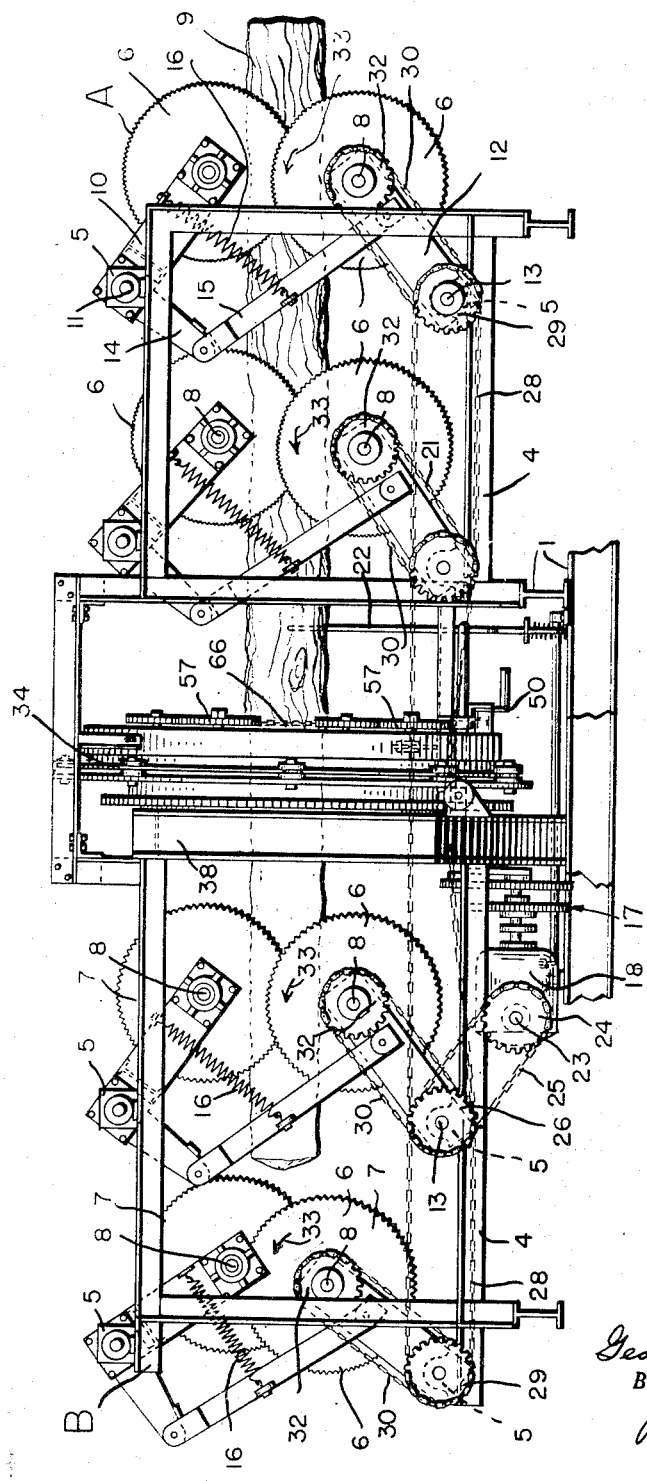
Fig. 1 is a side view of my machine with parts broken away.

In the drawing the reference numeral 1 indicates a base for my device on which a main drive shaft 2 is journalled to supply power to the machine from an engine 3.

The base 1 supports a pair of oppositely disposed frames 4—4 adjacent each side of the machine which carry bearings 5—5 which support feed rolls 6—6 for the machine. The feed rolls 6 may comprise a plurality of discs 7 having serrated peripheries, as shown, and being fixedly carried on a horizontal shaft 8 to rotate therewith. The shafts are provided in pairs spaced longitudinally of the frame, the rolls of each pair being one above the other, as shown, whereby the log 9 may be carried therebetween as shown. The longitudinally spaced pairs of rolls extend transversely of the machine, the axes of rotation of either the upper or lower ones of the pairs being normally coplanar and in substantially horizontal alinement.

The shafts 8 of the upper rolls 6 are carried on a pair of arms 10—10, one on each side of the machine, the shafts being journalled at one end of each of the arms as shown. The arms 10 are carried at their opposite end by a shaft 11 journalled in the bearings 5.

The lower rolls 6 are fixedly carried on a shaft 8, as above stated, and their shafts 8 are journalled at one end of an arm 12 which is fixedly carried on a shaft 13 journalled in the bearings 5 on the lower portion of the frame 4 in a manner similar to the mounting of the upper rolls, as is deemed apparent from the drawings.

The rolls of each pair of rolls are connected together in such a way as to counterbalance each other whereby they are substantially free floating and may flex toward and away from each other as required when a log 9 passes therebetween, it being deemed apparent that logs 9 may be of varying diameters, and may not all be perfectly straight, and this will require that the logs of each pair separate in varying degrees as different logs pass therethrough during the normal operation of the machine.

The counterbalancing of the rolls of each pair is accomplished by means of a linkage comprising an arm 14 secured to the shaft 11 to rotate therewith and extending at substantially right angles to the arm 10. A second link arm 15 is pivotally connected to the arm 14 at one end and to the arm 12 at its opposite end as shown. A spring 16 is connected between an intermediate portion of the link arm 15 and the arm 10 to bias the rolls to their minimum-gap positions whereby the rolls of each pair are substantially free floating and may move relative to each other to accommodate logs of various widths and curvatures.

Each of the pairs of feed rolls are substantially the same and are driven by means of a gear box 18 which has an input shaft connected to the drive shaft 2 through a suitable sprocket-chain reduction drive 17. The gear box 18 is preferably an automobile differential or similar structure and has a shaft 19 extending from one side thereof on which a mechanism 20 similar to an automobile brake drum mechanism, is carried. A suitable linkage 21 connects an operating lever 22 to the drum mechanism 20 whereby the drum mechanism may be engaged or disengaged as per the requirements of the machine as the operator observes the operation thereof. A second shaft 23 extends from the gear case 18 in the opposite direction from the shaft 19. Obviously, beveled gears are used in the gear box 18 similar to an automotive differential, whereby the shafts 19 and 23 may be rotated at right angles to the input shaft of the gear box.

On the shaft 23 is a sprocket 24 which serves as the main drive sprocket for the feed rolls, as will become apparent.

To provide selective powering of the drive sprocket 24, the lever 22 is employed to engage the brake drum mechanism 20 and thereby stop the shaft 19 from rotating. By the differential arrangement in the gear box 18, this will cause the sprocket 24 to rotate. The disengaging of the brake drum mechanism 20 will cause the sprocket 24 to stop rotating. The operator thus has a selective drive for the feed rolls to meet the requirements of the machine's operation by engaging and disengaging the drum mechanism 20 as required.

Figure 2:
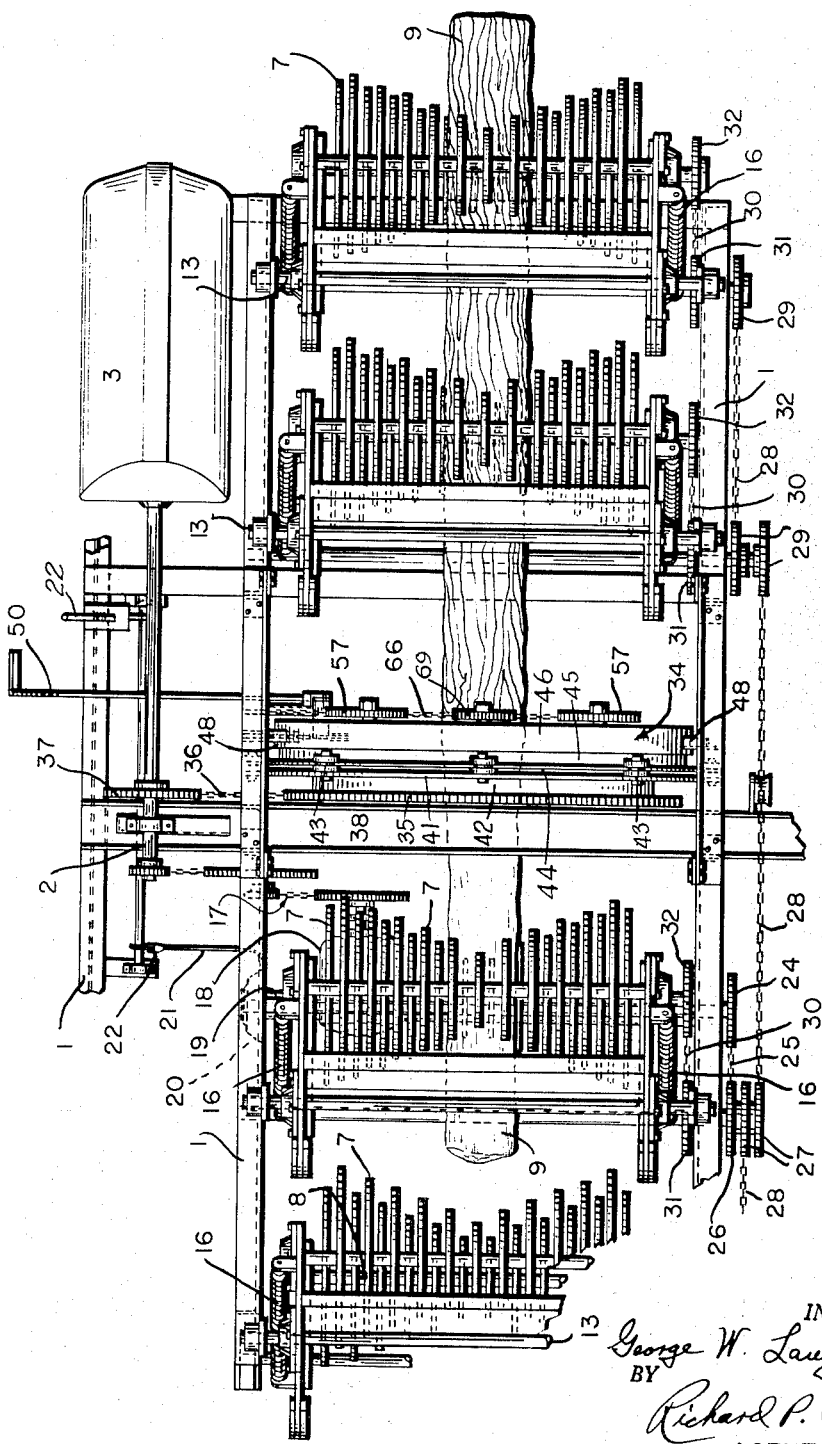
Fig. 2 is a top plan view of Fig. 1 with parts broken away.

A chain 25 connects the sprocket 24 with a sprocket 26 on an adjacent one of the shafts 13, which in turn fixedly carries a plurality of similar sprockets 27 on its outer end, see Fig. 2. From the sprockets 27, the lower rolls 6 are rotated, a plurality of longitudinally disposed drive chains 28—28 being driven from the shaft 13 which is driven by the chain 25. The chains 28 drive the remaining shafts 13 by means of suitable sprockets 29 mounted thereon, and chains 30—30 drive the lower rolls 6 by means of sprockets 31—31 on the shafts 13 and sprockets 32—32 on the shafts 8 of the lower rolls.

As can be seen from the drawing and the above description, when a log is fed to the feed rolls at the infeed end A of the machine and the feed rolls are rotated in the direction of arrows 33, a log may be carried by the rolls through the machine to the discharge end B thereof at any desired rate of speed determined by the operator so that peeling action may be applied to the log as it travels through the machine. The feed rolls serve to feed the log at a desired rate through the machine, and because of the operator's control of the movement of logs through the machine, any situation which may occur in the peeling operation may be adequately handled by the operator at the controls.

Intermediate the feed rolls at the infeed end A of the machine and the discharge end B thereof, is mounted the peeling mechanism or a head which is indicated generally by the reference numeral 34.

The barking mechanism 34 includes a main sprocket 35 of large diameter, as shown, which is driven by a chain 36 from a main drive sprocket 37 on the main drive shaft 2. The large driven sprocket 35 is carried on frame members 38—38 by means of a plurality of rollers 39 rotatably carried on the frame members 38. The main driven sprocket 35 has a central circular opening therethrough whereby the sprocket has an inner peripheral edge 40. There are a plurality of rollers 39 and they are arranged in a circular pattern on the frame members 38 whereby the inner peripheral edge of the sprocket 35 is rotatably supported on the rollers 39, see Figs. 6 and 7. The sprocket 35 has a barking head 41 fixed thereto as by an annular flange or joining member 42 secured therebetween. The sprocket 35 supports the barking head 41 on the rollers 39 as can be readily seen from Fig. 7.

The barking head carries a plurality of radially and circumferentially spaced pairs of small rollers 43—43 which rotatably support and carry a brake member 44 therebetween, the brake member being rotatable on the same axis as the sprocket 35 and barking head 41. As will be later explained, the brake member 44 normally rotates with the barking head 41 when the latter is rotated by the sprocket 35.

The brake member 44 includes an annular rim or drum 45 which is fixed thereto and extends therefrom as shown in Fig. 7. A brake band 46 is carried in close relationship to the brake drum 45 and has brake band material 47 thereon. The brake band 46 is supported on the frame as by the brackets 48 which are connected to the frame of the device there being a resilient connection 49 between the brackets 48 and the brake band 46. The brake-band-operating arrangement is provided to permit the band 46 to engage the drum 45 to retard the rotation of the brake 44 relative to the barking head 41. The brake-band-operating mechanism includes a lever 50 which may be foot operated, as shown, which is connected to linkage 51 to provide the means to engage or disengage the brake band from the drum 45.

The barking head 41 carries a plurality of barkers designated generally by the reference character 52 and shown in detail in Figs. 4 and 5. The barkers are pivotally carried on the barking head 41 by stub shafts 53 which are fixed to the barking head. As here shown, I employ three barkers, and they are spaced about the barking head substantially equal distance apart and substantially equal distance from the axis of rotation of the barking head as shown in Fig. 3.

Each of the barkers include an arm 54 which is pivotally carried on the shaft 53 and extends in both directions from the shaft though an inner end 55 of the arm is preferably longer than an outer end 56 thereof, as shown. The shaft 53 also rotatably carries a pair of sprockets 57 and 58, the pair of sprockets being carried on a common hub 59 to rotate together.

The inner end 55 of the arm 54 supports a stub shaft 61 which carries a sprocket 60 in coplanar or tandem relation to the sprocket 58, as shown. An endless chain-like member 62 is mounted around the sprockets 58 and 60, and has mounted thereon a plurality of cutters 63—63 which, during the operation of the machine, serve to remove the bark from the logs run through the machine. As shown in the drawings, the cutters may comprise substantially rectangular bars having squared or sharpened edges 64 (see Figs. 8 and 9) which will engage and remove bark as the chain member 62 is rotated by means to be described. The cutters 63 are secured by screws 65 so that they may be reversed when they become dull on one side.

The sprockets 57 are preferably carried on the outer ends of the shafts 53 as shown and in alinement with each other whereby a non-rotating chain 66 may be drivingly connected with all of the revolving sprockets 57 for rotating them. The chain 66 comprises a loop of chain as shown in Fig. 3 which has a section of chain 67 attached thereo and anchored to the frame 4 of the device as at 68. The loop of chain 66 also contacts idler sprockets 69—69 mounted on the barking head 41 whereby the loop is supported in a substantially circular position axially of the axis of rotation of the barking head so as to form in effect a stationary ring gear.

It is deemed apparent that the rotation of the barking head, on which the shafts 53 and barkers 52 are mounted, will cause the sprockets 57, 58, and 60 to be rotated because the chain 66 as here shown, is stationary and the sprockets 57, as they revolve, will ride the chain's loop 66 like revolving planetary gears ride a ring gear. The resulting rotation of these planetary sprockets will cause the cutter blades to be carried around by the endless chain members 62 to perform debarking operations, as will become apparent.

In order to transmit the rotation of the barking head 41 to the brake 44, and in order to bring the cutter blades into engagement with the log 9, I provide lugs 71 around the inner periphery of the brake drum 45 (see Figs. 3 and 6), one for each of the arms 54, and connect a tension spring 70 between each lug 71 and each of the outer ends 56 of the arms 54. The springs 70 connect the barking head 41 to the drum 45 of the brake 44 for either unitary rotation of the head and brake, or for limited relative rotation, as when the brake band 46 is applied. When the barking head 41 idly rotates in a clockwise direction, as indicated by the arrow in Fig. 6 and the brake band is not being applied, centrifugal force tends to pivot the barkers 52 clockwise about the shafts 53 so that the inner ends 55 of the arms 54 are biased away from the axis of rotation of the barking head to their log-admitting positions: meanwhile the springs 70, now under minimum tension, pull the brake 44 around the axis of the barker head, the brake 44 being pulled around at the same angular velocity that is imparted to the large sprocket 35 of the barking head 41.

Application of the brake band 46 to the drum 45 will slightly reduce the speed of rotation of the brake 44 so as to stretch the springs 70 and cause them to apply tension to the outer ends 56 of the arms 54 and thereby force the inner ends 55 of the arms toward the axis of rotation and thus bring the cutter blades 63 into engagement with the log 9.

As pointed out above, the endless cutter-carrying chains are actuated by the revolving planetary sprockets 57 engaging the ringlike chain 66 for induced rotation, the bark being stripped by the cutters as the log is fed through the machine. The brake-operating lever 50 is employed by the operator to maintain the proper drag on the brake 44 to hold the barkers 52 against the log, and the springs 70 permit the barkers to yieldably pivot on the shafts 53 so as to ride over irregularities in the log as it passes through the machine.

The operator of the machine thus has two controls to operate, the lever 22 which regulates the feed of the log to the barkers, and the brake lever 50 which holds the barkers against the log. When the lever 22 is operated to cause the log to be fed through the machine, the lever 50 is employed to hold the barkers against the log. Either lever may be released to accommodate unusual situations which may occur in any given log. When the lever 50 is released, centrifugal force pivots the barkers 52 away from the log, or clockwise about the shafts 53 (as viewed in Figs. 3 and 6), until they reach their inactive positions, brake 44 meanwhile being advanced slightly clockwise relative to the barking head 41 by the tensioned springs 70 until the aggregate tension in the latter becomes restored to its minimum value, after which occurrence the springs 70 will pull the brake 44 at the same speed of rotation as the barker head 41.

I have above described one mode of operation of my device and I wish it to be clearly understood that modifications might be made in the structure as above described without departing from the function of invention.

An annular shield 85 is secured by a flange 86 to the member 38 to prevent bark from fouling the barking head 34.

Having thus described my invention, what I claim is:

1. In a machine for removing from logs and the like; a frame, a barking head mounted on said frame and having an opening through which logs are axially fed, means for rotating said head, a plurality of barkers mounted on said head to rotate therewith, each of said barkers including an endless chain, a pair of sprockets carrying said chain, cutters on said chain, and means for driving said chain on said sprockets including a connection to a portion of said machine other than said head, and means for pivoting said barkers toward and away from an axis of rotation of said head as the latter rotates to engage a log fed into said head to remove bark from such a log, said last-mentioned means including a brake member carried by said barking head to rotate therewith, said brake member being movable relative to said head, a brake band carried on said frame adjacent said brake member and engagable with the latter to move same relative to said head, and means connecting said barkers to said brake member to cause said barkers to be pivoted as said brake member moves relative to said head.

2. In a machine for removing bark from logs and the like; a frame, a barking head mounted on said frame and having an opening through which logs are axially fed, means for rotating said head, barkers carried on said head to rotate therewith, means mounting said barkers pivotally to move toward and away from an axis of rotation of said head as the latter rotates, said barkers including bark-removing members and means for driving said bark-removing members as said head is rotated to remove bark from a log, said driving means including a rotatable planetary member on each of said barkers and connected with said bark-removing members to drive same, and a ringlike drive member engagable simultaneously with each of said rotatable planetary members, said barker-mounting means including a brake member carried by said barking head to rotate therewith, said brake member being movable relative to said head, a brake band carried on said frame adjacent said brake member and engageable with the latter to move same relative to said head, and means connecting said barkers to said brake member to cause said barkers to be pivoted as said brake member moves relative to said head.

3. In a machine for removing bark from logs and the like; a frame, a barking head mounted on said frame and having an opening through which logs are axially fed, means for rotating said head, barkers carried on said head to rotate therewith and being movable toward and away from an axis of rotation of said head to engage a log being fed through said rotating head, each of said barkers comprising an arm pivotally mounted on said head, a pair of sprockets rotatably mounted on said arm in spaced tandem relationship, an endless carrier meshing said sprockets, a plurality of cutters mounted on said endless carrier, and means for driving said sprockets as said head is rotated to remove bark from such a log, said last-named means including a rotatable planetary member mounted on said head in coaxial relationship with one of said sprockets so that the latter is rotated by the planetary member, and a ringlike drive member engageable simultaneously with each of said rotatable planetary members to cause said endless carrier and cutters to be driven as said head is rotated.

4. In a machine for removing bark from logs and the like; a frame, a barking head mounted on said frame and having an opening through which logs are axially fed, means for rotating said head, barkers carried on said head to rotate therewith and being movable toward and away from an axis of rotation of said head to engage a log being fed through said rotating head, each of said barkers comprising an arm pivotally mounted on said head, a pair of sprockets rotatably mounted on said arm in spaced tandem relationship, an endless carrier meshing said sprockets, a plurality of cutters mounted on said endless carrier, and means for driving said sprockets as said head is rotated to remove bark from such a log, said last-named means including a rotatable planetary member mounted on said head in coaxial relationship with one of said sprockets so that the latter is rotated by the planetary member, and a ringlike drive member engageable simultaneously with each of said rotatable planetary members to cause said endless carrier and cutters to be driven as said head is rotated, and means for pivoting said barkers toward and away from the axis of rotation of said head to engage a log being fed through said rotating head to remove bark from such a log, said barker-pivoting means including a brake member carried by said barking head to rotate therewith, said brake member being movable relative to said head, a brake band carried on said frame adjacent said brake member and engageable with the latter to move same relative to said head, and means connecting one end of said arms to said brake member to cause said arms to be pivoted as said brake member moves relative to said head.

References Cited in the file of this patent
UNITED STATES PATENTS

| 1,017,655 | Drake | Feb. 20, 1912 |
| 1,283,070 | Callender | Oct. 29, 1918 |
| 1,901,247 | Kinzbach | Mar. 14, 1933 |
| 2,576,912 | Astrom | Dec. 4, 1951 |
| 2,591,751 | Whitlock | Apr. 8, 1952 |
| 2,646,092 | Kolpe et al. | July 21, 1953 |
| 2,655,961 | McComb | Oct. 20, 1953 |

FOREIGN PATENTS

| 146,958 | Sweden | Sept. 14, 1954 |